United States Patent
Baker et al.

(10) Patent No.: US 11,820,330 B2
(45) Date of Patent: *Nov. 21, 2023

(54) PROVISIONING A VEHICLE EXPERIENCE ACCORDING TO AN AUTHENTICATION OF A DRIVER FOR THE VEHICLE EXPERIENCE

(71) Applicant: Capital One Services, LLC, McLean, VA (US)

(72) Inventors: Samuel Baker, Frisco, TX (US); Kana Mishra, Farmers Branch, TX (US); Michelle Nguyen, Dallas, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/449,160

(22) Filed: Sep. 28, 2021

(65) Prior Publication Data
US 2023/0100264 A1 Mar. 30, 2023

(51) Int. Cl.
*B60R 25/24* (2013.01)

(52) U.S. Cl.
CPC ...... *B60R 25/241* (2013.01); *B60R 2325/108* (2013.01); *B60R 2325/205* (2013.01)

(58) Field of Classification Search
CPC ............ B60R 25/241; B60R 2325/108; B60R 2325/205
USPC ....................................................... 340/439
See application file for complete search history.

(56) References Cited

U.S. PATENT DOCUMENTS

| | | | |
|---|---|---|---|
| 9,842,443 B1* | 12/2017 | Weng | B60R 25/241 |
| 10,407,026 B2* | 9/2019 | Penilla | G06Q 30/0645 |
| 10,589,719 B1* | 3/2020 | Sohn | G07C 9/21 |
| 11,042,816 B2* | 6/2021 | Zaid | G06F 21/35 |
| 2007/0239992 A1* | 10/2007 | White | B60K 28/063 |
| | | | 713/186 |
| 2008/0106390 A1* | 5/2008 | White | B60K 26/02 |
| | | | 340/5.2 |
| 2011/0099036 A1 | 4/2011 | Sarkissian et al. | |
| 2011/0112969 A1* | 5/2011 | Zaid | G06F 21/35 |
| | | | 701/2 |
| 2011/0288891 A1* | 11/2011 | Zaid | G06Q 30/0611 |
| | | | 705/26.4 |
| 2013/0305320 A1* | 11/2013 | Warrick | G06F 21/31 |
| | | | 726/4 |
| 2014/0278555 A1* | 9/2014 | Johnson | G06Q 10/02 |
| | | | 705/3 |

(Continued)

*Primary Examiner* — Zhen Y Wu
(74) *Attorney, Agent, or Firm* — Harrity & Harrity, LLP

(57) ABSTRACT

In some implementations, a vehicle experience system may receive a service request associated with a vehicle. The vehicle experience system may qualify a driver for a vehicle experience involving the vehicle. The vehicle experience system may provide, to a user device associated with the driver, a verification code for authenticating the vehicle experience involving the driver and the vehicle. The vehicle experience system may provide, to a location management system associated with the vehicle, a notification that the vehicle is to be involved in the vehicle experience. The vehicle experience system may provide, to the location management system and based on receiving scan data being associated with the verification code, the authentication of the vehicle experience to enable a provisioning device to facilitate access to the vehicle.

20 Claims, 9 Drawing Sheets

(56) References Cited

U.S. PATENT DOCUMENTS

| | | | |
|---|---|---|---|
| 2014/0278599 A1* | 9/2014 | Reh | H04W 4/80 |
| | | | 705/5 |
| 2014/0278608 A1* | 9/2014 | Johnson | B60R 25/24 |
| | | | 705/5 |
| 2016/0127373 A1* | 5/2016 | Avary | G06Q 30/0185 |
| | | | 726/4 |
| 2016/0203661 A1* | 7/2016 | Pudar | G07C 9/00571 |
| | | | 340/5.25 |
| 2016/0352715 A1 | 12/2016 | Saini et al. | |
| 2017/0263062 A1* | 9/2017 | Bergerhoff | B60R 25/24 |
| 2018/0054317 A1* | 2/2018 | Decke | B60R 25/24 |
| 2018/0134254 A1* | 5/2018 | Penilla | G07C 9/20 |
| 2018/0247469 A1 | 8/2018 | Cacabelos et al. | |
| 2019/0122470 A1* | 4/2019 | Endo | B60R 25/209 |
| 2019/0362344 A1* | 11/2019 | Koeppel | G07C 9/253 |
| 2020/0130616 A1* | 4/2020 | Tzivanopoulos | B60K 35/00 |
| 2021/0073363 A1* | 3/2021 | Talha | B60R 25/24 |
| 2022/0292591 A1* | 9/2022 | Denais | G06Q 50/30 |

* cited by examiner

PROVISIONING A VEHICLE EXPERIENCE ACCORDING TO AN AUTHENTICATION OF A DRIVER FOR THE VEHICLE EXPERIENCE

BACKGROUND

A vehicle experience may provide an individual, such as a driver, access to a vehicle for a period of time to permit the individual to review the vehicle. For example, prior to leasing or purchasing a vehicle, an individual may have access to the vehicle, via a test drive, to review the vehicle and/or confirm whether the vehicle satisfies the individual's expectations. Additionally, or alternatively, a vehicle experience may involve a driver gaining rental access to a vehicle and/or recreational access to a vehicle for a limited period of time.

SUMMARY

In some implementations, a system for authenticating a driver for a vehicle experience includes one or more memories and one or more processors, communicatively coupled to the one or more memories, configured to: receive, from a user device, a service request associated with the driver and a vehicle, wherein the service request includes driver information associated with the driver and vehicle information associated with the vehicle; obtain, based on the driver information, qualification information associated with the driver; provide, to the user device and based on the qualification information indicating that the driver is qualified for the vehicle experience, a verification code that is associated with the driver and the vehicle; identify, based on the vehicle information, a location management system that is associated with the vehicle; and cause the location management system to provision the vehicle experience based on the verification code; receive, from the location management system, an authentication request associated with a scan of the verification code; authenticate the driver for the vehicle experience based on the authentication request including scan data associated with the verification code; and cause, based on authenticating the driver for the vehicle experience, the location management system to enable the driver to access the vehicle.

In some implementations, a non-transitory computer-readable medium storing a set of instructions includes one or more instructions that, when executed by one or more processors of a device, cause the device to: receive a service request associated with a vehicle, wherein the service request includes driver information associated with a driver and vehicle information associated with the vehicle; qualify, based on the driver information, the driver for a vehicle experience involving the vehicle; provide, to a user device associated with the driver and based on qualifying the driver for the vehicle experience, a verification code for authenticating the vehicle experience involving the driver and the vehicle; provide, to a location management system associated with the vehicle, a notification that the vehicle is to be involved in the vehicle experience, wherein the notification is configured to cause the location management system to provision the vehicle experience based on an authentication of the driver; receive, from the location management system, scan data associated with a scan of the verification code by a provisioning device associated with the location management system; and provide, to the location management system and based on the scan data being associated with the verification code, the authentication of the vehicle experience to enable the provisioning device to facilitate access to the vehicle.

In some implementations, a method for authenticating a driver for a vehicle experience includes receiving, from a user device, a service request for a vehicle experience; qualifying, based on driver information in the service request, the driver for the vehicle experience; identifying, based on qualifying the driver, a vehicle for the vehicle experience that is associated with vehicle information in the service request; generating, based on vehicle experience information in the service request, a digital vehicle key that facilitates access to the vehicle for the vehicle experience; and providing, to the user device, the digital vehicle key to permit the driver to access to the vehicle via the user device.

DETAILED DESCRIPTION

Figure 1A:
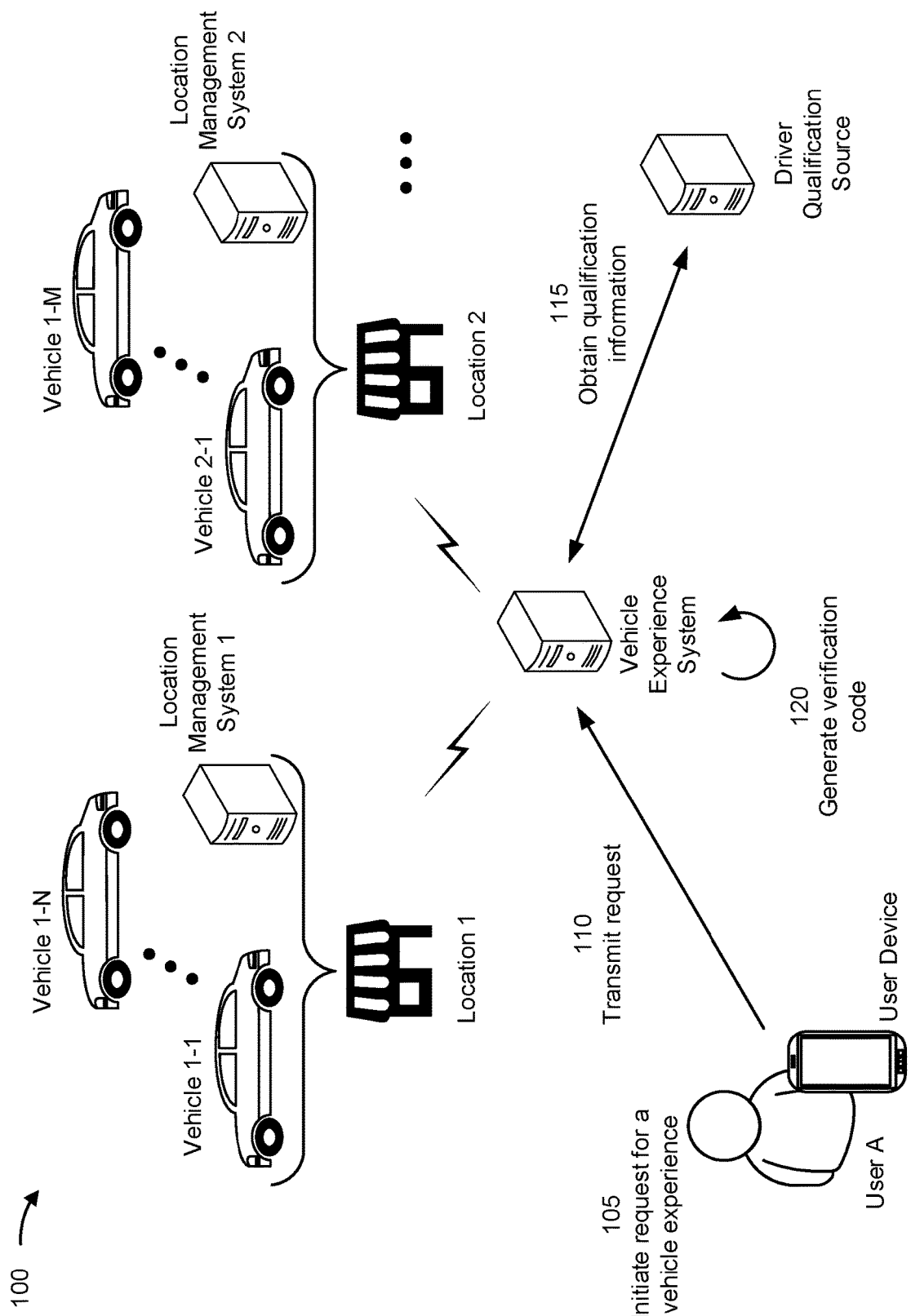
FIGS. 1A-1D are diagrams of an example implementation relating to provisioning a vehicle experience according to an authentication of a driver for the vehicle experience.

The following detailed description of example implementations refers to the accompanying drawings. The same reference numbers in different drawings may identify the same or similar elements.

A test drive typically involves an individual requesting a seller (e.g., an individual or organization, such as a manufacturer, dealer, or other entity that sells vehicles) to allow the individual to drive a vehicle for a period of time and accessing the vehicle from a location of the seller. For example, a consumer may arrive at a dealership and request the dealership to authorize the test drive. An agent (or representative) of the dealership, via an in-person interaction with the consumer, may determine whether to authorize the test drive based on whether the consumer is qualified to the drive the vehicle (e.g., based on whether the agent verifies that the consumer has a driver license to drive a type of the vehicle and/or insurance coverage to drive the vehicle). Accordingly, via such a review, the agent and/or the dealership may attempt to maintain security of the vehicle by authenticating the consumer (e.g., using the consumer's driver license as an identification) and/or qualifying the consumer as a driver for the vehicle experience. However, because malicious individuals can relatively easily falsify an identification, such an authentication process can be unreliable. Accordingly, certain systems may be incapable of enabling a dealership to accurately authenticate or qualify a driver for a vehicle experience and/or may prevent the dealership from provisioning a vehicle experience without an agent reviewing the consumer's qualification information.

Furthermore, in some cases, the consumer may need to provide personal information, such as contact information (e.g., a name, residential address, telephone number, and/or email address), that would permit the agent (e.g., a sales associate or marketing representative) or the dealership to further communicate with the consumer, regardless of the consumer's desire to continue to communicate with the dealership or continue a relationship with the dealership following the vehicle experience. In such a case, certain systems may be incapable of enabling the consumer to engage in a vehicle experience without providing certain personal information to the dealership, thereby preventing the consumer from engaging in the vehicle experience while remaining anonymous.

Some implementations described herein provide a vehicle experience system that enables a consumer (e.g., a driver) to engage in a vehicle experience involving a vehicle without the consumer having to engage in an in-person interaction at the dealership and/or provide personal information associated with the consumer. For example, the vehicle experience system may receive a service request for a vehicle experience involving a vehicle, identify a system associated with the vehicle (e.g., a location management system that manages an inventory of a dealership associated with the vehicle), and automatically authenticate a driver for the vehicle experience and/or provision the vehicle experience. More specifically, the vehicle experience system and/or the system may automatically (e.g., based on an authentication of the driver) provide a key to the vehicle (e.g., a physical vehicle key and/or a digital key) to provision the vehicle experience. In some implementations, the vehicle experience system may authenticate the vehicle experience and/or the driver via a verification code that can be generated based on specific information associated with the driver and/or the requested vehicle experience. As described herein, the verification code may provide enhanced security over an identification-based authentication that is performed during an in-person interaction (e.g., by allowing for a multi-factor authentication using a user device and/or application on the user device) while enabling the driver to remain anonymous. In some implementations, the vehicle experience system may be configured to qualify the driver for the vehicle experience system based on qualification information (e.g., driver license information, vehicle insurance information, background information, financial information, and/or another type of qualification information) associated with the driver. The driver may be a consumer seeking to purchase or lease the vehicle and/or a user of the vehicle experience system that does not own the vehicle at the time of the vehicle experience.

In this way, the vehicle experience system may securely facilitate and/or provision a vehicle experience at a dealership location or other location associated with a vehicle involved in the vehicle experience. Accordingly, the vehicle experience system may prevent fraud, provide flexibility and efficient scheduling or provisioning of vehicle experiences for consumers and/or dealerships, and enhance a consumer experience involved in test driving a vehicle or engaging in other types of vehicle experiences, such as viewing a vehicle and/or testing features of the vehicle without test driving the vehicle, among other examples.

FIGS. 1A-1D are diagrams of an example implementation 100 relating to provisioning a vehicle experience according to an authentication of a driver for the vehicle experience. As shown in FIGS. 1A-1D, example implementation 100 includes a vehicle experience system, a user device associated with a user (User A), one or more location management systems (Location Management System 1, Location Management System 2, and so on) associated with corresponding vehicle locations (Location 1, Location 2, and so on), a provisioning device, a driver qualification source, and an agent device associated with an agent (Agent B). In example implementation 100, a set of N vehicles (Vehicle 1-1 to Vehicle 1-N) are associated with a first location management system (Location 1) and another set of M vehicles (Vehicle 2-1 to Vehicle 2-M) are associated with a second location management system (Location 2). These systems and/or devices are described in more detail below in connection with FIG. 3 and FIG. 4.

In example implementation 100, the user may be qualified as a driver for a test drive involving a vehicle and the test drive may be automatically provisioned for the user without an in-person interaction with the agent and/or without the user having to provide personal information (e.g., contact information) to the agent (thereby enabling the user to remain anonymous during the test drive). The agent may be a representative (e.g., a sales representative and/or a customer service representative) of an entity (e.g., a dealership) that owns and/or operates a vehicle location (e.g., Location 1) and/or a vehicle (e.g., Vehicle 1-1). Accordingly, in some implementations, the agent may be authorized, via the agent device and/or by the entity, to provision a vehicle for the test drive. Although example implementation 100 is described in connection with a vehicle experience that involves a test drive of a vehicle, example implementation 100 may include or involve other types of vehicle experiences.

As shown in FIG. 1A, and by reference number 105, the user initiates a request for a vehicle experience. For example, the user may initiate a service request via the user device and/or an application of the user device. The application may be associated with the vehicle experience system and/or be configured to permit a user of the application (and/or the user device) to be authenticated as a driver for a vehicle experience involving a vehicle. In some implementations, the user may have an account associated with the application and/or be required to log into the application via a user credential (e.g., a username, an account identifier, a password, and/or a biometric scan, among other examples), which may serve as a factor (e.g., a first factor) of a multi-factor authentication described herein.

In some implementations, the application may have access to the location management systems. Accordingly, the application may permit the user to identify or browse an inventory of N vehicles associated with the first location management system and/or an inventory of M vehicles associated with the second location management system, and so on. Additionally, or alternatively, one or more of the location management systems may be accessible through a website (e.g., a dealership website associated with the vehicle locations). In this way, the user may initiate a request for a vehicle experience by browsing a vehicle inventory associated with a location management system and/or selecting or indicating a vehicle experience involving a vehicle (e.g., selecting the vehicle for a test drive and/or indicating that the user is interested in test driving the vehicle). Based on a selection of the vehicle (e.g., Vehicle 1-1) and/or the location management system, the user device (and/or the application) may receive, from the user, vehicle information for a vehicle of a vehicle experience.

The user, when initiating the service request, may provide, to the user device and/or the application, driver information associated with the user that may be used to set up a vehicle experience, authenticate and/or qualify the user for the vehicle experience, and/or provision the vehicle experience, as described herein. Additionally, or alternatively, the user may provide the driver information when setting up an account associated with the application.

As further shown in FIG. 1A, and by reference number 110, the user device transmits the service request to the vehicle experience system. The user device may transmit the service request based on a user input from the user. The user input may cause transmission of the service request. In this way, the user may provide the service request to cause the vehicle experience system and/or the location management system to set up or provision a vehicle experience involving a selected vehicle (e.g., a particular vehicle from a particular vehicle inventory associated with a particular vehicle location) and/or a vehicle that meets certain criteria that are indicated in the vehicle information provided by the user to the user device. As described herein, the service request may include vehicle information associated with a vehicle and/or driver information associated with the user.

The vehicle information may identify a vehicle characteristic associated with the vehicle. For example, the vehicle information may identify a make and/or a model of a vehicle (Vehicle 1 in example implementation 100), a year of manufacture of the vehicle, a vehicle identification number (VIN) of the vehicle, a trim level of the vehicle (or specific features of the vehicle), a type of the vehicle, a location of the vehicle (which may correspond to a location of the vehicle location or an entity that owns or is managing a sale or lease of the vehicle), and/or an identifier of an entity associated with the location management systems. In this way, the user device and/or the application may receive vehicle information associated with a vehicle that may be involved in a vehicle experience with the user, as described herein.

The driver information may identify a driver characteristic of the user that may be used to authenticate the user and/or verify that the user may be a qualified driver of the vehicle. For example, the driver information may indicate a name of the user, an age of the user, vehicle preferences of the user (e.g., one or more characteristics of the vehicle that are preferred by the user), and/or other user profile information associated with a vehicle or vehicle experience. In some implementations, the driver information may identify a location of the user (e.g., a current location of the user device and/or a location of a residence of the user). In some implementations, the location of the user may correspond to a desired location for a vehicle experience involving the vehicle (e.g., a location of the user and/or a location associated with the location management system that is nearest the user). In this way, the user device and/or the vehicle experience system may receive driver information and/or vehicle information for the vehicle experience to permit the user to be qualified as a driver and/or to permit a location management system to provision a vehicle for the vehicle experience, as described herein.

In some implementations, the driver information (and/or the service request) may include qualification information that is associated with the user being a qualified driver. For example, the qualification information may include driver license information associated with the user's driver license. The driver license information may include a name of the user on the driver license, an address associated with the user on the driver license, a date of issuance, an expiration date, a unique identification number, a jurisdiction that issued the driver license, and/or a class of vehicles that the user is qualified to drive (e.g., a commercial driver license class or non-commercial driver license class), among other examples. In some implementations, the qualification information may include an image of the driver license (e.g., an image captured by a camera of the user device that depicts the driver license of the user).

The qualification information may include insurance information associated with the user. The insurance information may identify a policy associated with the user operating a vehicle, a policy associated with the user operating a particular class of vehicle, an insurance agency that issued the policy, an issue date or expiration date of the policy, or other insurance information. In this way, the user device and/or the vehicle experience system may receive qualification information associated with the user to permit the user to be qualified for a vehicle experience (e.g., to be qualified to test drive the vehicle).

As further shown in FIG. 1A, and by reference number 115, the vehicle experience system obtains a qualification from the driver qualification source. For example, the vehicle experience system may obtain the qualification based on the driver information and/or the vehicle information. More specifically, the vehicle experience system may obtain the qualification using qualification information.

The driver qualification source may be a system that is configured to validate qualification information associated with a user to qualify the user as a driver for the vehicle experience. For example, the driver qualification source may be associated with a driver database of a jurisdiction that issued the user's driver license. In such a case, the vehicle experience system may obtain, from the driver qualification source, a qualification that indicates that the user is a licensed driver (e.g., based on the driver qualification source validating the driver license information and/or an image of the user's driver license). Additionally, or alternatively, the driver qualification source may be associated with an insurance policy database of an insurance agency that issued an indicated insurance policy in the qualification information. In such a case, the vehicle experience system may obtain, from the driver qualification source, a qualification that indicates that the user is insured to drive the vehicle (e.g., based on the driver qualification source validating that the insurance policy covers the user, a class of the vehicle, and/or the requested vehicle experience).

In some implementations, a driver qualification source may be configured to prequalify the user for a loan from a financial institution related to purchasing the vehicle requested for the service request and/or a vehicle involved in the vehicle experience. The user may interact with the user device to select an option associated with becoming pre-qualified for the loan. For example, the user device may enable the user to input information associated with becoming pre-qualified for the loan. More specifically, a user interface of the user device may display one or more text input fields through which the user can input information requested by a financial institution (which may be associated with a driver qualification source and/or be one of the driver prequalification sources) to pre-qualify the user for a loan. The user may input the requested information and the user device (e.g., the server device associated with the user interface) may provide the input information to the financial institution. Correspondingly, the vehicle experience system may qualify the user as a driver for the vehicle experience if the driver qualification source (and/or the financial institution) indicates that the driver is prequalified for a loan to purchase the vehicle.

In this way, the vehicle experience system may obtain one or more qualifications for the user to engage in the vehicle experience system from one or more corresponding driver qualification sources that processed the qualification information. Correspondingly, the vehicle experience system may qualify the user as a driver for the vehicle experience. Therefore, the vehicle experience system may permit the user to be qualified for a vehicle experience without the user having to provide physical documentation and/or identification to an individual (e.g., the agent) at a vehicle location associated with the vehicle.

As further shown in FIG. 1A, and by reference number 120, the vehicle experience system generates a verification code. The vehicle experience system may generate the verification code for use in authenticating the driver and/or provisioning the vehicle experience, as described elsewhere herein. The vehicle experience system may generate the verification code based on qualifying the driver for the vehicle experience.

The verification code may include an optical code that is configured to be scanned from an output component of the user device via a scanner (e.g., an image capture device, such as a camera) of the provisioning device. In some implementations, the agent device may be used to scan the verification code to authenticate the user without the user having to provide personal information to the agent and/or without the agent having to authenticate the user using a physical identification (e.g., a driver license of the user). For example, the verification code may include a one-dimensional barcode (e.g., a parallel line code), a two-dimensional barcode (e.g., quick response (QR) code), and/or an animated or dynamic code. Accordingly, the verification code may be used to verify, once the verification code is scanned by the agent device, that the user and the agent are engaging in a vehicle experience, as described elsewhere herein.

The vehicle experience system may generate the verification code using a code generator. The code generator may be associated with the application and/or utilize any suitable encryption technique to generate the verification code. The code generator may be associated with and/or installed on the vehicle experience system or another system. Additionally, or alternatively, the code generator may be locally installed on the user device.

In some implementations, the verification code may be generated based on the driver information associated with the user and/or vehicle information associated with the vehicle. For example, the vehicle experience system may generate the verification code based on a driver characteristic of the user and/or a vehicle characteristic of the vehicle. In some implementations, the vehicle experience system may generate the verification code based on qualification information associated with qualifying the user as a driver for the vehicle experience. Additionally, or alternatively, the vehicle experience system may generate the verification code based on a vehicle characteristic of the vehicle that is identified in the vehicle information. The vehicle experience system may generate the verification code based on a device characteristic associated with the user device (e.g., a device identifier of the user device, account information associated with an account of the application, a location of the user device) and/or a request characteristic associated with the service request (e.g., a time associated with the user requesting the vehicle experience, an agent or vehicle location identified in the service request, and/or the like).

Accordingly, the verification code may be generated as a unique code that is configured specifically for a vehicle experience involving the user and/or the vehicle. More specifically, the verification code may be generated based on an encryption of the driver information or the vehicle information to enable the driver to automatically be authenticated for a specific vehicle experience and/or to enable the specific vehicle experience to automatically be provisioned. Accordingly, the user and/or the vehicle experience may be securely authenticated and/or provisioned without the user having to interact with the agent and/or without the user having to provide confidential information to the agent or the entity associated with the vehicle.

Figure 1B:
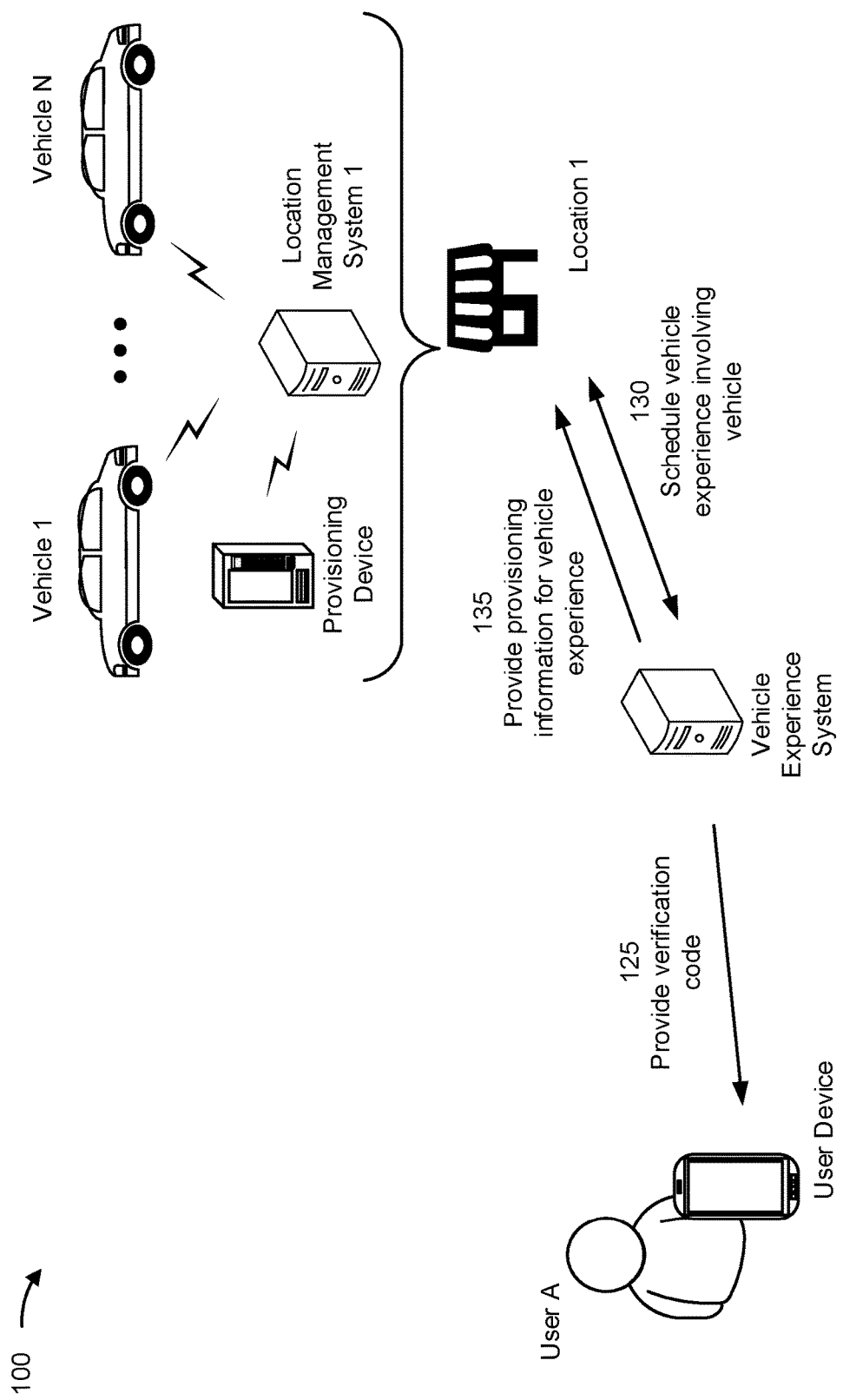

As shown in FIG. 1B, and by reference number 125, the vehicle experience system provides the verification code to the user device. The vehicle experience system may provide the verification code based on receiving the qualification of the driver from a driver qualification source that processed the qualification information of the user. In this way, the user device may receive the verification code to permit the user to be authenticated as a driver for a vehicle experience and/or to permit the vehicle experience to automatically be provisioned, as described elsewhere herein.

As further shown in FIG. 1B, and by reference number 130, the vehicle experience system and/or a location management system (Location Management System 1) schedules the vehicle experience involving the vehicle. For example, the vehicle experience system may interact with the location management system to schedule the vehicle experience during a requested time frame of the user (e.g., as indicated in the service request) and/or an available time frame for the vehicle experience as indicated by the location management system. The location management system may indicate an available time frame for the vehicle experience based on accessing a calendar associated with the vehicle (e.g., a calendar that indicates time frames that the vehicle is available for the vehicle experience) and/or an entity associated with the location management system. In this way, the vehicle experience system and/or the location management system may coordinate to schedule the vehicle experience during a time period that overlaps a time frame requested by the user and an available time frame for the vehicle experience as indicated by the location management system.

The vehicle experience system may identify the location management system using a vehicle inventory data structure (e.g., a data structure that maps a vehicle and/or characteristics of a vehicle to a corresponding location of the vehicle). Accordingly, the vehicle experience system may identify the location management system as being associated with the vehicle and/or the user based on information from the service request. For example, the vehicle experience system may determine that the location management system is associated with the vehicle, based on the vehicle information identifying a VIN of the vehicle and an inventory mapping (e.g., within the vehicle inventory data structure) that indicates that the location management system is associated with the vehicle. Additionally, or alternatively, the vehicle experience system may identify the location management system based on determining, from the inventory mapping, that the location management system is associated with one or more vehicles that satisfy certain criteria of a vehicle identified in the service request. In some implementations, the vehicle experience system may select the location management system, from the plurality of location management systems, to receive provisioning information and/or facilitate a vehicle experience based on the location management system being associated with a vehicle location that is within a certain distance of a location of the user (and/or the user device).

As further shown in FIG. 1B, and by reference number 135, the vehicle experience system provides provisioning information to the location management system. For example, the vehicle experience system may provide the provisioning information within a notification that the user requested the vehicle experience involving a vehicle associated with the location management system. The vehicle experience system may provide the notification based on the vehicle information indicating that the vehicle is associated with the location management system.

The vehicle experience information may include information associated with the driver and/or the vehicle to the location management system and/or the provisioning device to authenticate the user and/or provision the vehicle experience, as described elsewhere herein. For example, the vehicle provisioning information may include a qualification of the driver and/or information associated with the verification code to permit the provisioning device to authenticate the driver via the verification code and/or provision the vehicle experience based on a scan of the verification code. Additionally, or alternatively, the vehicle experience information may include a VIN of the vehicle and/or requested criteria for a vehicle for the vehicle experience. In this way, the location management system and/or the provisioning device may identify the vehicle (e.g., based on a mapping of the vehicle to a key registry of the location management system and/or the provisioning device) and/or find a vehicle that meets certain criteria of a vehicle requested by the user in the service request.

Figure 1C:
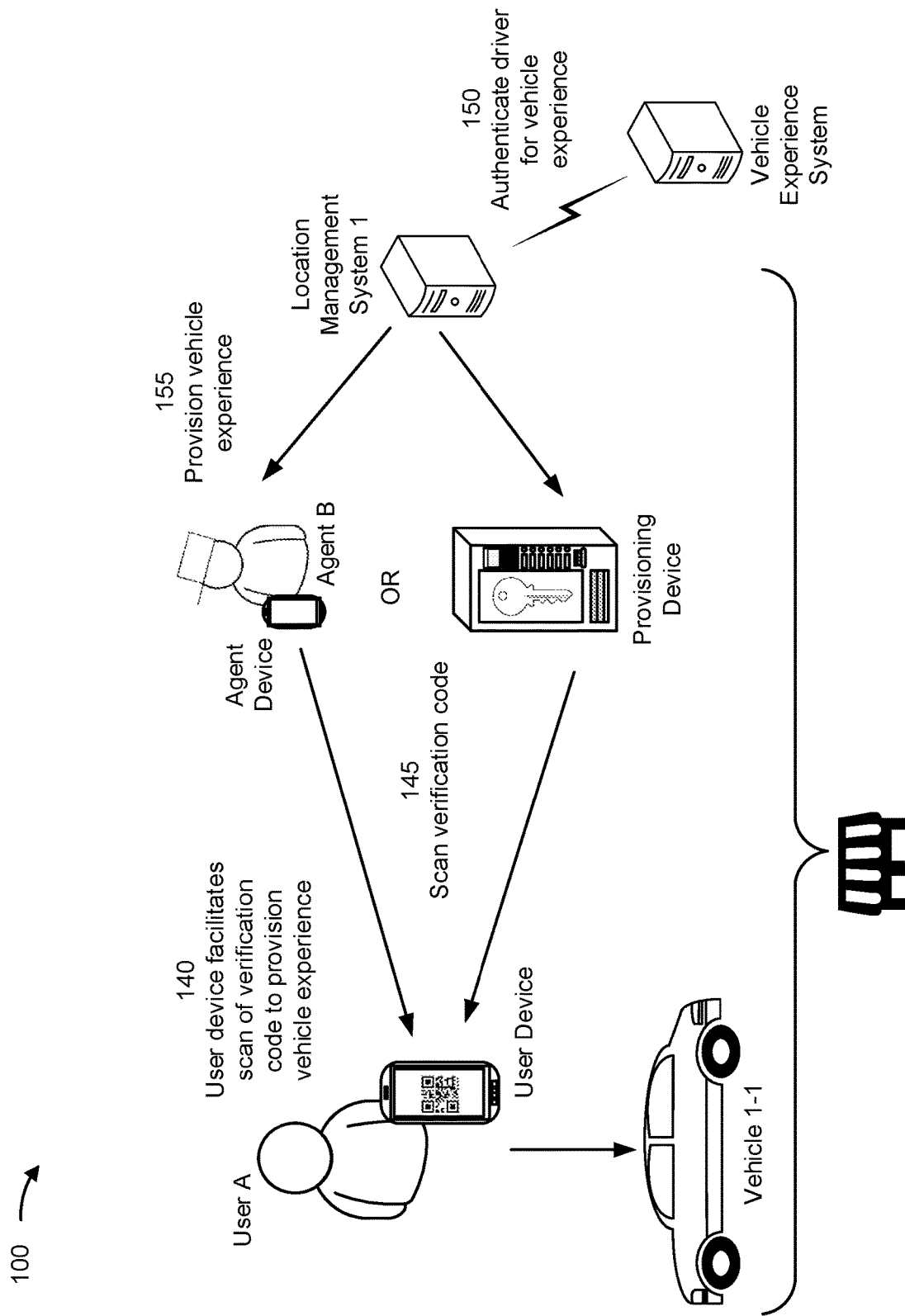

As shown in FIG. 1C, and by reference number 140, the user device facilitates a scan of the verification code to provision the vehicle experience. For example, the user device may display the verification code via a display device of the user device. In this way, because the verification code is to be displayed within a field of view of a scanner of the provisioning device, a scan of the verification code may represent an authentication of the user and/or a vehicle experience involving the user as a qualified driver of the vehicle for the vehicle experience.

While certain examples are described herein in connection with a verification code being displayed as an optical code, other types of verification codes may be considered to authenticate a driver for a vehicle experience. For example, an audible code may be emitted from a speaker of the user device so that the provisioning device can interpret an audio signal from the speaker that includes the audible code. Additionally, or alternatively, the code may be emitted and/or communicated via a wireless communication signal (e.g., a BLUETOOTH® signal, a BLUETOOTH LOW-ENERGY® (BLE) signal, a near field communication (NFC) signal, or other type of wireless communication protocol signal).

As further shown in FIG. 1C, and by reference number 145, the provisioning device and/or the agent device scans the verification code. For example, the user may cause a scanner of the provisioning device to scan and/or decode the verification code. Additionally, or alternatively, the agent may cause a scanner of the agent device to scan and/or decode the verification code. A scanner (e.g., of the provisioning device and/or the agent device) may include a barcode scanner and/or an image capture device.

In some implementations, the provisioning device may decode the verification code by processing scan data from the scanner. For example, the provisioning device may decode the verification code in association with a decryption technique (e.g., a decryption technique provided in the provisioning information and/or that is configured for use within the provisioning device) that corresponds to the encryption technique used by the code generator to generate the verification code. In this way, the provisioning device may obtain driver information (e.g., driver license information, an image of the user's driver license, qualification information, or a qualification of the user as a driver for the vehicle experience system) associated with the user to permit the provisioning device, the location management system and/or the vehicle experience to authenticate the user as a driver for the vehicle experience. For example, the provisioning device may prompt the user to provide another factor for authentication of the user (e.g., a factor that is decoded from the decrypting of the verification code). In this way, in combination with the user providing a credential associated with the application as described above, the provisioning device may facilitate multi-factor authentication of the user to authenticate the driver for the vehicle experience, thereby providing improved security over other systems or authentication techniques (e.g., using only a physical identification of the user).

Similarly, the agent device (e.g., in the event that the provisioning device is inoperable or inaccessible) may scan the verification code to authenticate the user as a driver and/or provision the vehicle experience. The agent, based on the agent device obtaining vehicle information associated with the vehicle from decoding the verification code, may request the user to verify a characteristic of the vehicle, thereby obtaining another factor for authenticating the user as a driver for the vehicle experience. In such a case, the agent may securely (e.g., via a multi-factor authentication process and without reviewing a physical identification of the user) provision the vehicle experience without obtaining personal information associated with the user (e.g., by providing a physical vehicle key to the vehicle), thereby permitting the user to be anonymously authenticated as a driver for the vehicle experience.

As further shown in FIG. 1C, and by reference number 150, the vehicle experience system and/or the location management system may authenticate the vehicle experience. In some implementations, the provisioning device and/or the agent device may provide an authentication request to the location management system and/or the vehicle experience system in association with the scan of the verification code. Accordingly, the vehicle experience system may receive the authentication request to permit the vehicle experience system to decrypt the scan data according to a decryption technique that corresponds to the encryption technique. In such a case, based on the scan data being associated with a scan of the verification code for the vehicle experience, the vehicle experience system may provide driver information and/or vehicle information to the provisioning device to facilitate authentication of the user as a driver for the vehicle experience and/or indicate the vehicle (Vehicle 1-1) that is involved in the vehicle experience.

As further shown in FIG. 1C, and by reference number 155, the provisioning device and/or the agent may provision the vehicle experience. For example, based on authenticating the user and/or the vehicle experience, the vehicle experience system (and/or location management system) may cause the provisioning device to enable access to the vehicle and/or instruct the agent (e.g., via the agent device) to permit the user to access the vehicle.

The provisioning device may be configured to enable access to a physical vehicle key of the requested vehicle (e.g., similar to a vending machine). In this way, the user may obtain automatic access to the vehicle for the vehicle experience without having to interact with the agent or the entity associated with the vehicle. Moreover, the user may be authenticated as a driver for the vehicle experience without being an owner of the vehicle (e.g., because the user is indicated as qualified to drive the vehicle according to a qualification from the driver qualification source and/or authenticated as the driver according to the multi-factor authentication process described herein).

Figure 1D:
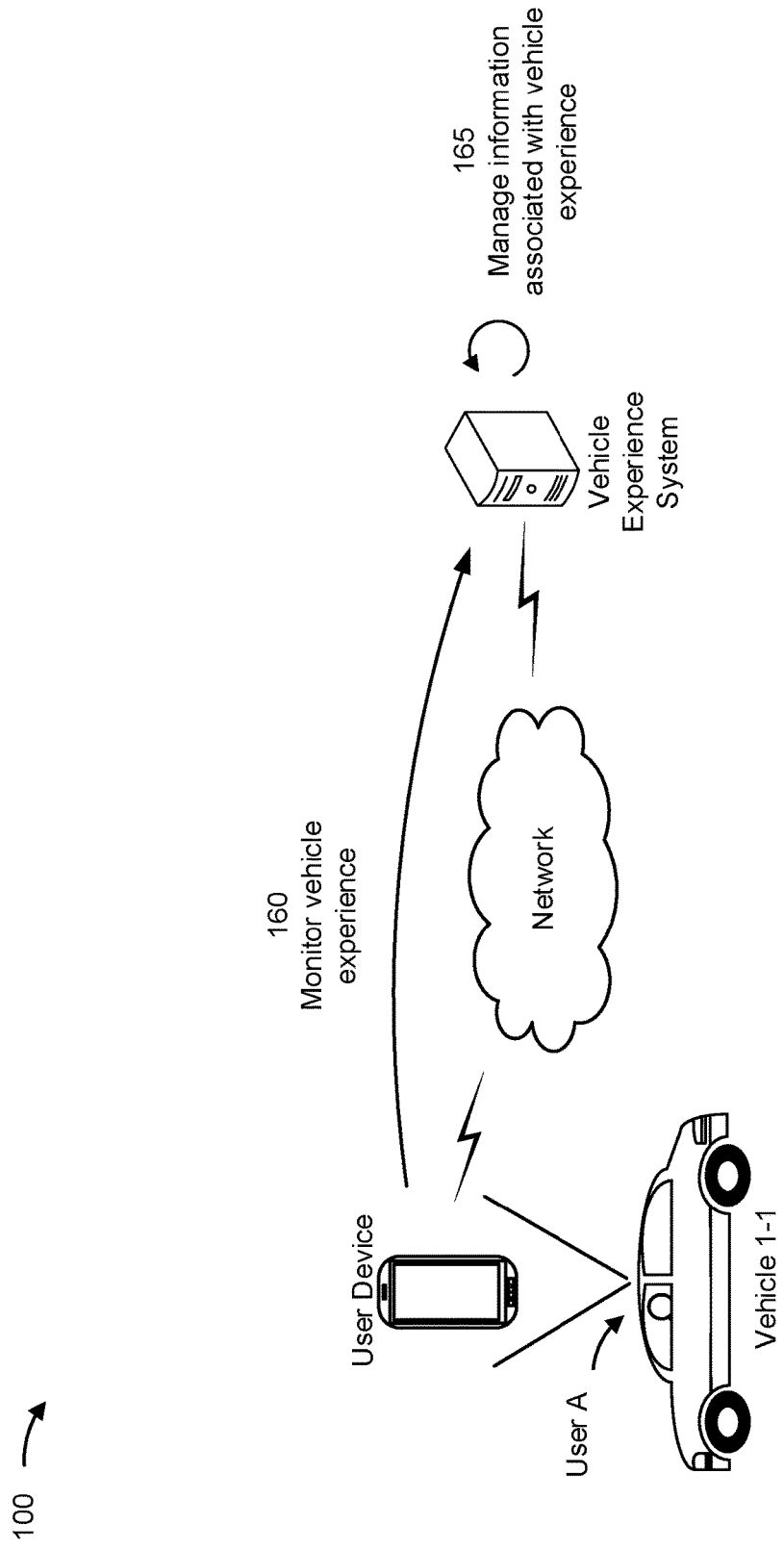

As shown in FIG. 1D, and by reference number 160, the vehicle experience system may monitor the vehicle experience. For example, to maintain security of the vehicle (e.g., for the entity), the vehicle experience system may be configured to receive location information associated with the user device (e.g., via the application) and/or timing information associated with the vehicle experience (e.g., to ensure that a time period associated with the vehicle experience does not expire prior to the user returning the vehicle to the vehicle location). In some implementations, based on the vehicle experience traveling outside of a particular distance from the vehicle location (e.g., using a geofence or the like), the vehicle experience system may send a notification to the agent device or other system to alert the agent (or other authorities) of potential fraudulent activity involving the vehicle (which may involve a theft of the vehicle). Additionally, or alternatively, the vehicle experience system may similarly provide a notification if the vehicle, during the vehicle experience system, appears to be driven from a different course provided, via the application to the user during the vehicle experience. In some implementations, in the event that the user, via the user device, stops sharing location information associated with the user device, the vehicle experience system may similarly send a notification to the agent to indicate the potential fraudulent activity.

Additionally, or alternatively, if the user follows certain instructions (e.g., navigation instructions, timing instructions associated with a duration of the vehicle experience, or the like), the vehicle experience may maintain that information in association with the account of the user (e.g., to offer an award or discount associated with purchasing the vehicle and/or to track a trust level associated with the user engaging in a vehicle experience that involves automatic or anonymous provisioning, as described herein).

As further shown in FIG. 1D, and by reference number 165, the vehicle experience system manages information associated with the vehicle experience. In some implementations, the vehicle experience system may monitor information from the user device, the agent device, and/or the vehicle to manage, via a record log, the vehicle experience. The record log may be associated with the user and/or the vehicle (e.g., to maintain a database of vehicles that the user test drove, a trust level of the user, and/or to maintain a database of test drivers of the vehicle). Accordingly, the vehicle experience system may manage the information associated with the vehicle experience by storing, in a record log, the driver information and/or the vehicle information in association with the vehicle experience (e.g., using an entry or record that is identified by an identifier associated with the vehicle experience).

In some implementations, the vehicle experience system may verify which vehicle is involved in the vehicle experience. For example, the vehicle experience system may request and/or receive an identifier (e.g., a VIN) of the vehicle from the provisioning device (which may have identified the vehicle based on the VIN being mapped to the provided physical vehicle key). Accordingly, the vehicle experience system may store the identifier of the vehicle in association with the driver information to confirm that the user and the vehicle were involved in the vehicle experience. Additionally, or alternatively, the vehicle experience system may provide a notification to the user device that verifies that the vehicle is the vehicle that was requested by the user and/or that the vehicle satisfies certain criteria requested by the user via the service request.

In some implementations, the vehicle experience system may request and/or receive feedback from the user via the user device. The feedback may be associated with the vehicle experience and indicate whether the user test drove the vehicle, whether the vehicle matched the requested vehicle and/or certain criteria indicated in the service request, whether the user was satisfied with certain features of the vehicle or a performance of the vehicle during the vehicle experience, and/or a sentiment of the user relative to the vehicle experience.

Accordingly, as described herein, the vehicle experience system may enable a user (or driver) to be qualified to engage in a vehicle experience, be authenticated as a driver for the vehicle experience, and anonymously access a vehicle for the vehicle experience while maintaining safety and security of an agent involved in the vehicle experience and/or the vehicle. Furthermore, the vehicle experience system may automatically provision a vehicle for a vehicle system by providing a vehicle key (e.g., a physical vehicle key) to the user without the user having to interact with an agent of the entity. Accordingly, the vehicle experience system may provide, over other systems, a more convenient vehicle experience for a user, without sacrificing the safety or security of the vehicle. Furthermore, the vehicle experience system may allow for improved efficiency with respect to offering certain vehicle experiences by enabling a user to be accurately qualified as a driver without requiring an in-person interaction between the user and a seller of a vehicle.

As indicated above, FIGS. 1A-1D are provided as an example. Other examples may differ from what is described with regard to FIGS. 1A-1D. The number and arrangement of devices shown in FIGS. 1A-1D are provided as an example. In practice, there may be additional devices, fewer devices, different devices, or differently arranged devices than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) shown in FIGS. 1A-1D may perform one or more functions described as being performed by another set of devices shown in FIGS. 1A-1D.

Figure 2A:
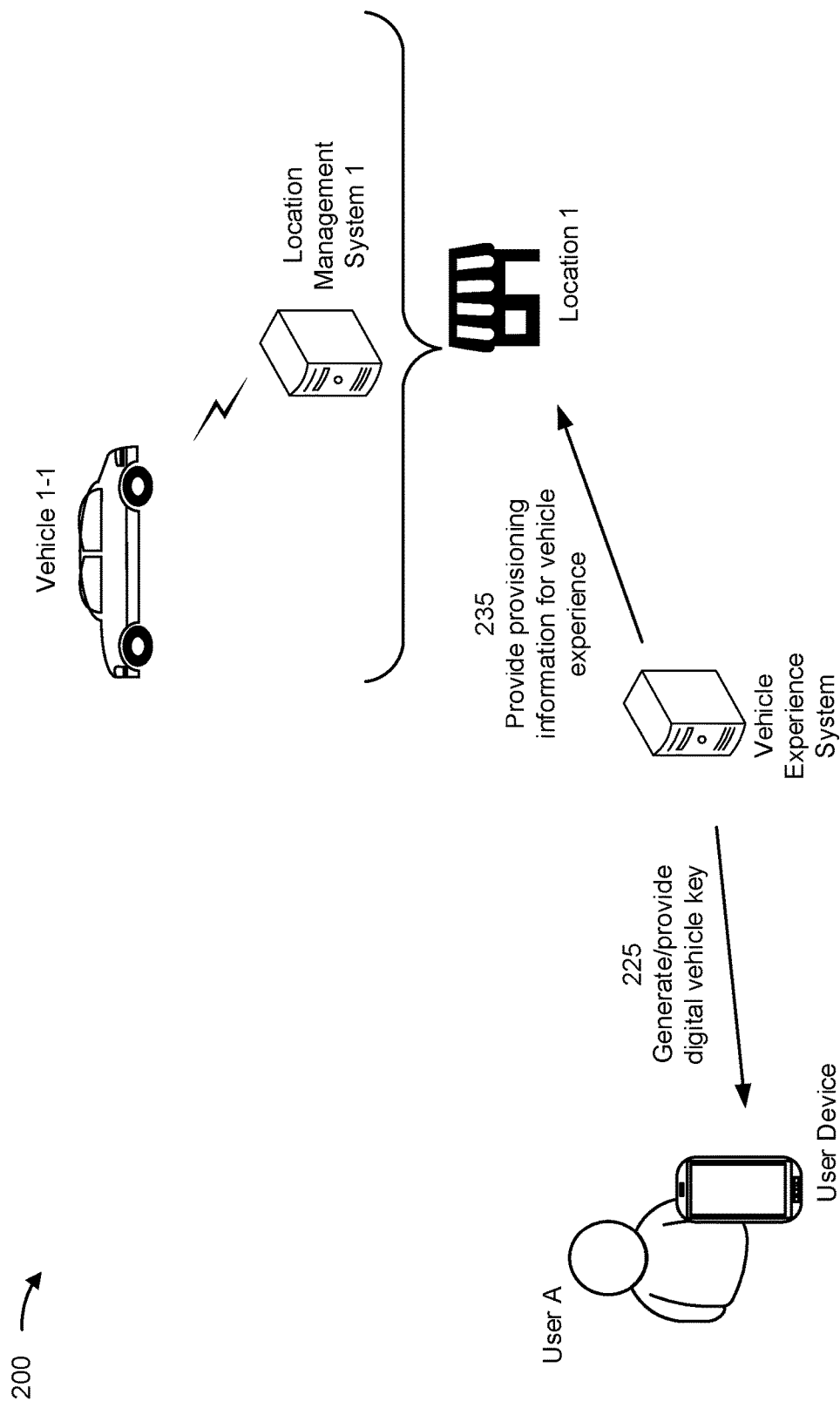
FIGS. 2A and 2B are diagrams of an example implementation described herein.
Figure 2B:
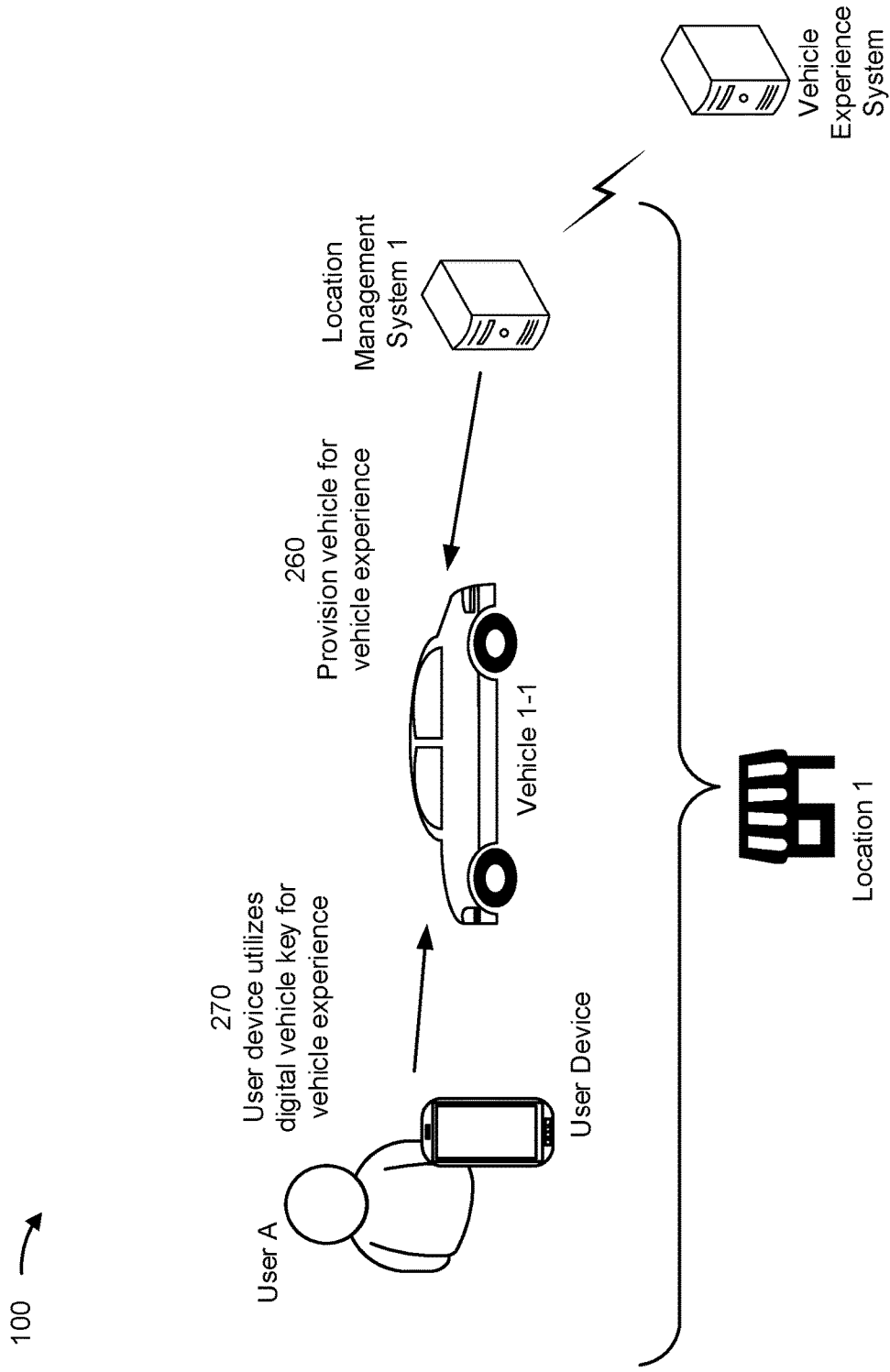

FIGS. 2A-2B are diagrams of an example implementation 200 associated with provisioning a vehicle experience according to an authentication of a driver for the vehicle experience. As shown in FIGS. 2A-2B, example implementation 200 includes a vehicle experience system, a user device associated with a user (User A), and a location management system (Location Management System 1) associated with a vehicle location (Location 1). One or more examples of example implementation 200 may correspond to similar examples of example implementation 100 (e.g., as examples that may correspondingly be performed as alternatives or in addition to corresponding examples of example implementation 100). These devices are described in more detail below in connection with FIG. 3 and FIG. 4.

As shown in FIG. 2A, and by reference number 225, the vehicle experience system generates and/or provides a digital vehicle key to the user device. For example, the vehicle experience system may generate and/or provide the digital vehicle key in a similar manner as described above in connection with the verification code of example implementation 100. More specifically, the vehicle experience system may generate and/or provide the digital vehicle key based on receiving a service request for a vehicle experience and/or based on qualifying the user for the vehicle experience, as described elsewhere herein.

In example implementation 200, the digital vehicle key may correspond to a wireless key (a passcode that can be transmitted to the vehicle via any suitable technique, such as BLUETOOTH®, near field communication (NFC), Wi-Fi, or the like) that provides access to the vehicle. Accordingly, using any suitable encryption technique, the vehicle experience system may generate the digital vehicle key to be configured. to wirelessly enable access to the vehicle via the user device (e.g., using the application of the user device).

In some implementations, the digital vehicle key may be configured to enable access to the vehicle (or allow the vehicle to operate) for a particular time period. For example, based on a time period associated with the vehicle experience (e.g., a time requested in the service request and/or scheduled as described herein), the vehicle experience system may configure the digital vehicle key to enable access to the vehicle only during the time period. In the event that the vehicle experience is initiated before the time period, the digital vehicle key may not allow access to the vehicle. Additionally, or alternatively, if the vehicle experience extends beyond an expiration of the time period, the digital vehicle key may expire and be configured to instruct or cause the vehicle to shut down (e.g., perform one or more operations to safely slow the vehicle and/or prevent a current driver from driving the vehicle). In this way, the vehicle experience system may configure the digital vehicle key to allow access to or operation of the vehicle only during a time period that is associated with the vehicle experience, thereby providing security over a vehicle experience that may be automatically provisioned using the digital vehicle key, as described herein.

Additionally, or alternatively, the digital vehicle key may be configured to enable access to the vehicle (or allow the vehicle to operate) within a particular area. For example, based on a location of the vehicle (e.g., the vehicle location) and/or the vehicle experience (e.g., a location requested in the service request or identified based on the vehicle information as described herein), the vehicle experience system may configure the digital vehicle key to enable access to the vehicle only within an area (e.g., which may be defined by a certain distance from the location) of the vehicle location.

As further shown in FIG. 2A, and by reference number 235, the vehicle experience system may provide provisioning information to the location management system. For example, the vehicle experience system may provide the provisioning information in a similar manner as described above in connection with example implementation 100. In some implementations, the provisioning information may include a notification to provision the vehicle for the vehicle experience during a time period identified in the vehicle experience system. In such a case, the digital vehicle key may be generated based on a confirmation that the location management system has provisioned the vehicle (e.g., scheduled or allocated the vehicle for the vehicle experience) for the vehicle experience system. For example, the digital vehicle key may be generated to enable access to the vehicle only the time period that is confirmed by the location management system (e.g., via a scheduling technique or protocol, as described herein).

As shown in FIG. 2B, and by reference number 260, the vehicle experience system and/or the location management system provisions the vehicle for the vehicle experience. For example, the vehicle experience system may provide information associated with the digital vehicle key that permits the vehicle to recognize the user device based on the user device providing (or broadcasting) the digital vehicle key (e.g., via a wireless communication).

As further shown in FIG. 2B, and by reference number 270, the user device utilizes the digital vehicle key for the vehicle experience. For example, when the user is within a wireless communication range of the vehicle and/or a certain distance of the vehicle (e.g., a distance that may be defined by a wireless communication protocol used to broadcast the digital vehicle key), the digital vehicle key and/or user device may permit the user to unlock, access, activate, and/or drive the vehicle during the vehicle experience. In this way, as described herein, the vehicle experience may automatically be provisioned in a manner that permits the user to access the vehicle using a digital vehicle key. Accordingly, in such an example, the user may not have to access a provisioning device or interact with an agent to obtain a physical key, which may be required for vehicles that are not compatible or incapable of operating using a digital vehicle key.

As indicated above, FIGS. 2A-2B are provided as an example. Other examples may differ from what is described with regard to FIGS. 2A-2B. The number and arrangement of devices shown in FIGS. 2A-2B are provided as an example. In practice, there may be additional devices, fewer devices, different devices, or differently arranged devices than those shown in FIGS. 2A-2B. Furthermore, two or more devices shown in FIGS. 2A-2B may be implemented within a single device, or a single device shown in FIGS. 2A-2B may be implemented as multiple, distributed devices. Additionally, or alternatively, a set of devices (e.g., one or more devices) shown in FIGS. 2A-2B may perform one or more functions described as being performed by another set of devices shown in FIGS. 2A-2B.

Figure 3:
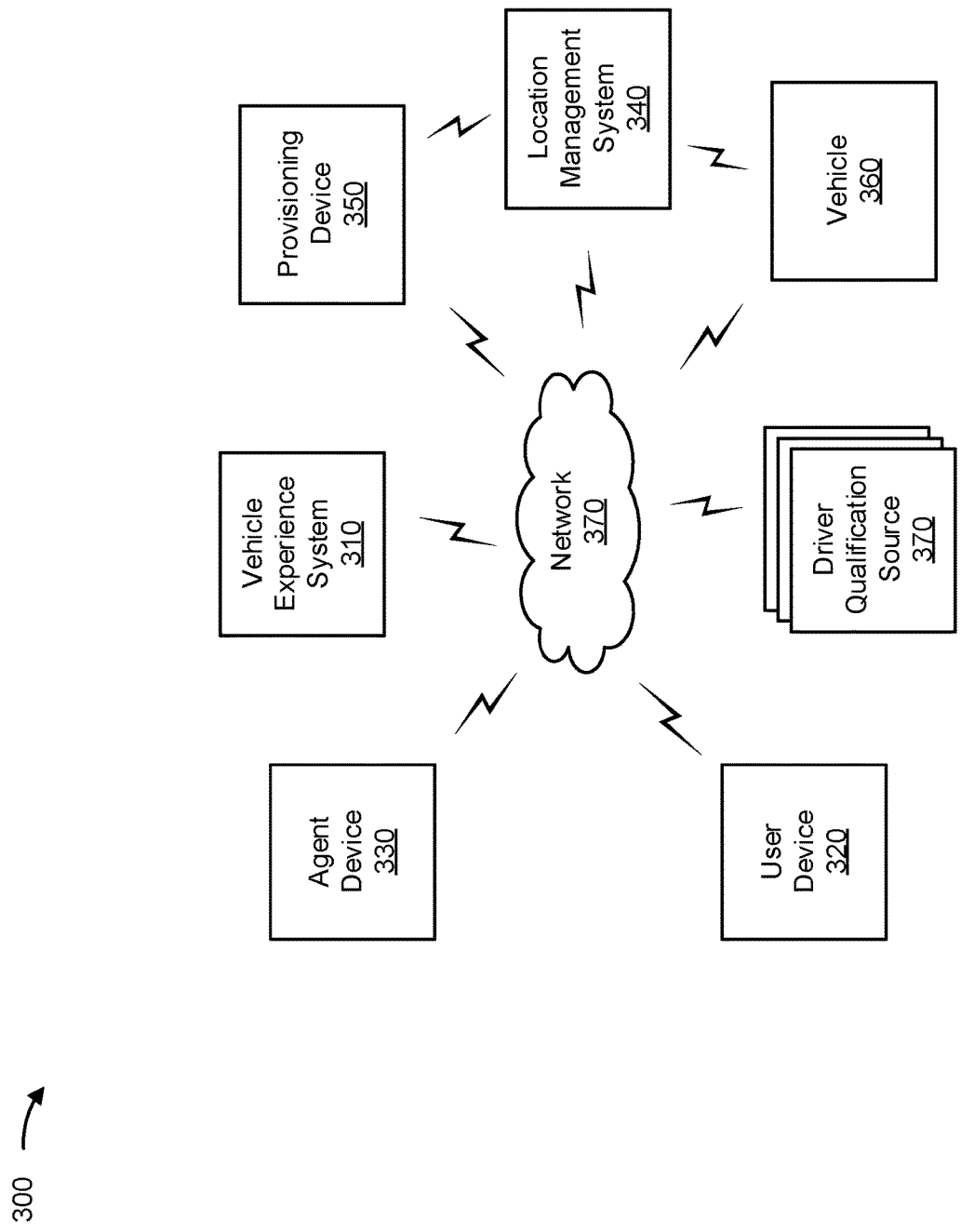
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a vehicle experience system 310, a user device 320, an agent device 330, a location management system 340, a provisioning device 350, a vehicle 360, driver qualification source 370, and a network 380. Devices of environment 300 may interconnect via wired connections, wireless connections, or a combination of wired and wireless connections.

The vehicle experience system 310 includes one or more devices capable of receiving, generating, storing, processing, providing, and/or routing information associated with authenticating a vehicle experience and/or provisioning the vehicle experience, as described elsewhere herein. The vehicle experience system 310 may include a communication device and/or a computing device. For example, the vehicle experience system 310 may include a server, such as an application server, a client server, a web server, a database server, a host server, a proxy server, a virtual server (e.g., executing on computing hardware), or a server in a cloud computing system. In some implementations, the vehicle experience system 310 includes computing hardware used in a cloud computing environment.

The user device 320 includes one or more devices capable of receiving, generating, storing, processing, and/or providing information associated with a driver requesting and/or facilitating provisioning of a vehicle experience, as described elsewhere herein. The user device 320 may include a communication device and/or a computing device. For example, the user device 320 may include a wireless communication device, a mobile phone, a user equipment, a laptop computer, a tablet computer, a desktop computer, a set-top box, a wearable communication device (e.g., a smart wristwatch, a pair of smart eyeglasses, a head mounted display, or a virtual reality headset), or a similar type of device.

The agent device 330 includes one or more devices capable of receiving, generating, storing, processing, and/or providing information associated with facilitating an authentication of a driver for a vehicle experience, as described elsewhere herein. The agent device 330 may include a communication device and/or a computing device. For example, the agent device 330 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The location management system 340 includes one or more devices capable of receiving, generating, storing, processing, providing, and/or routing information associated with a vehicle involved in a vehicle experience and/or provisioning a vehicle experience, as described elsewhere herein. The location management system 340 may include a communication device and/or a computing device. For example, the location management system 340 may include a server, such as an application server, a client server, a web server, a database server, a host server, a proxy server, a virtual server (e.g., executing on computing hardware), or a server in a cloud computing system. In some implementations, the location management system 340 includes computing hardware used in a cloud computing environment.

The provisioning device 350 includes one or more devices capable of receiving, generating, storing, processing, and/or providing information associated with provisioning a vehicle experience (e.g., by providing access to a vehicle and/or a key of the vehicle), as described elsewhere herein. The provisioning device 350 may include a communication device and/or a computing device. For example, the provisioning device 350 may include a kiosk device and/or vending machine that is configured to provide access to a physical vehicle key of a vehicle, or a similar type of device.

The vehicle 360 includes one or more devices capable of receiving, generating, storing, processing, and/or providing information associated with provisioning a vehicle experience involving the vehicle 360, as described elsewhere herein. The vehicle 360 may include a communication device and/or a computing device. For example, the vehicle 360 may be capable, via the communication device and/or the computing device, of being provisioned for a vehicle experience via a digital key, a particular communication, and/or a particular instruction (e.g., from the vehicle experience system 310, the location management system 340, and/or the provisioning device 350), as described elsewhere herein.

The driver qualification source 370 includes one or more devices capable of receiving, generating, storing, processing, providing, and/or routing information associated with qualifying a driver for a vehicle experience, as described elsewhere herein. The driver qualification source 370 may include a communication device and/or a computing device. For example, the driver qualification source 370 may include a server, such as an application server, a client server, a web server, a database server, a host server, a proxy server, a virtual server (e.g., executing on computing hardware), or a server in a cloud computing system. In some implementations, the driver qualification source 370 includes computing hardware used in a cloud computing environment.

The network 380 includes one or more wired and/or wireless networks. For example, the network 380 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 380 enables communication among the devices of environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
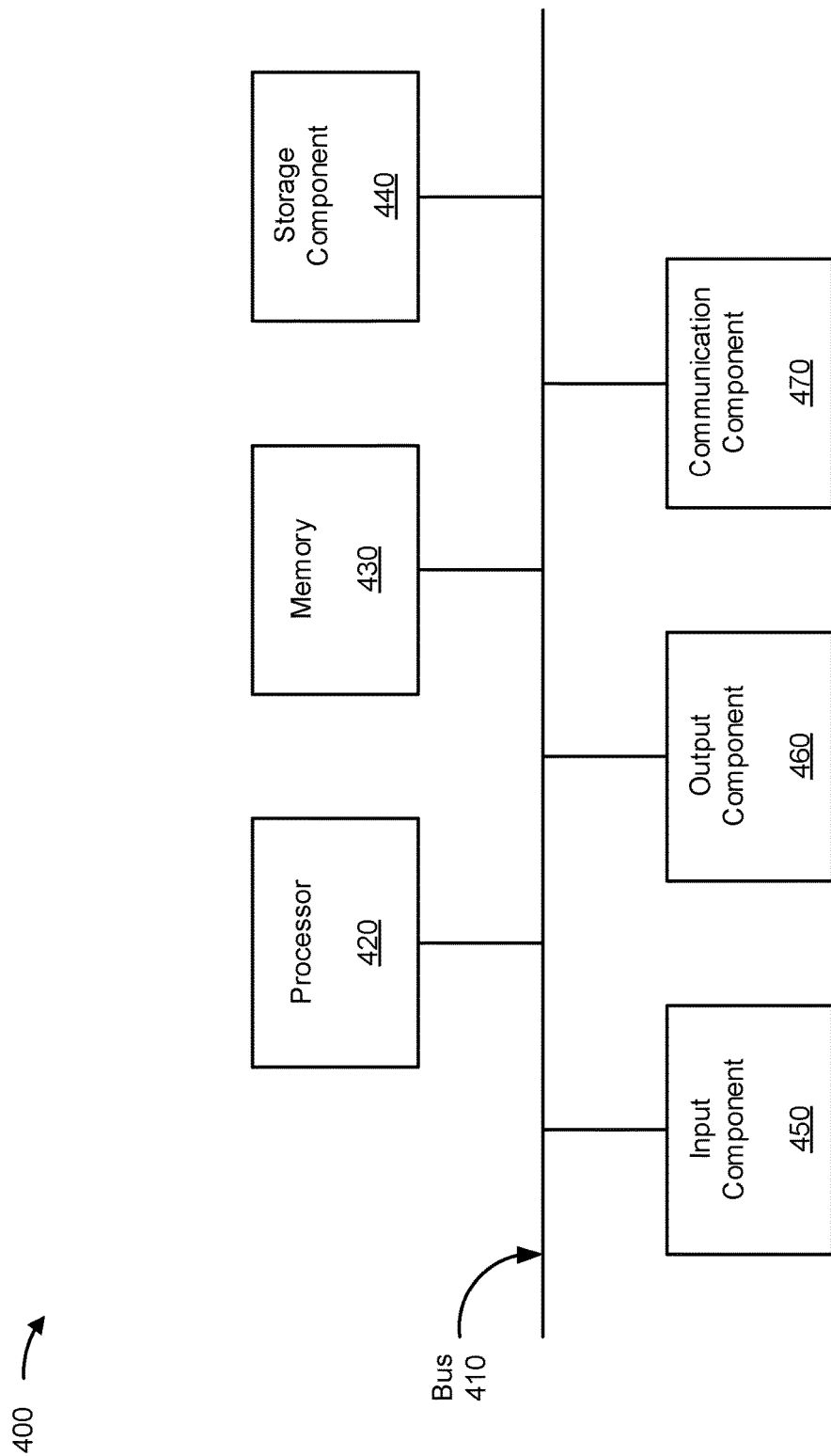
FIG. 4 is a diagram of example components of one or more devices of FIG. 3.

FIG. 4 is a diagram of example components of a device 400, which may correspond to the vehicle experience system 310, the user device 320, the agent device 330, the location management system 340, a provisioning device 350, a vehicle 360, and/or the driver qualification source 370. In some implementations, the vehicle experience system 310, the user device 320, the agent device 330, the location management system 340, the provisioning device 350, the vehicle 360, and/or the driver qualification source 370 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory, a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, and/or an actuator. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, and/or an antenna.

Device 400 may perform one or more processes described herein. For example, a non-transitory computer-readable medium (e.g., memory 430 and/or storage component 440) may store a set of instructions (e.g., one or more instructions, code, software code, and/or program code) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
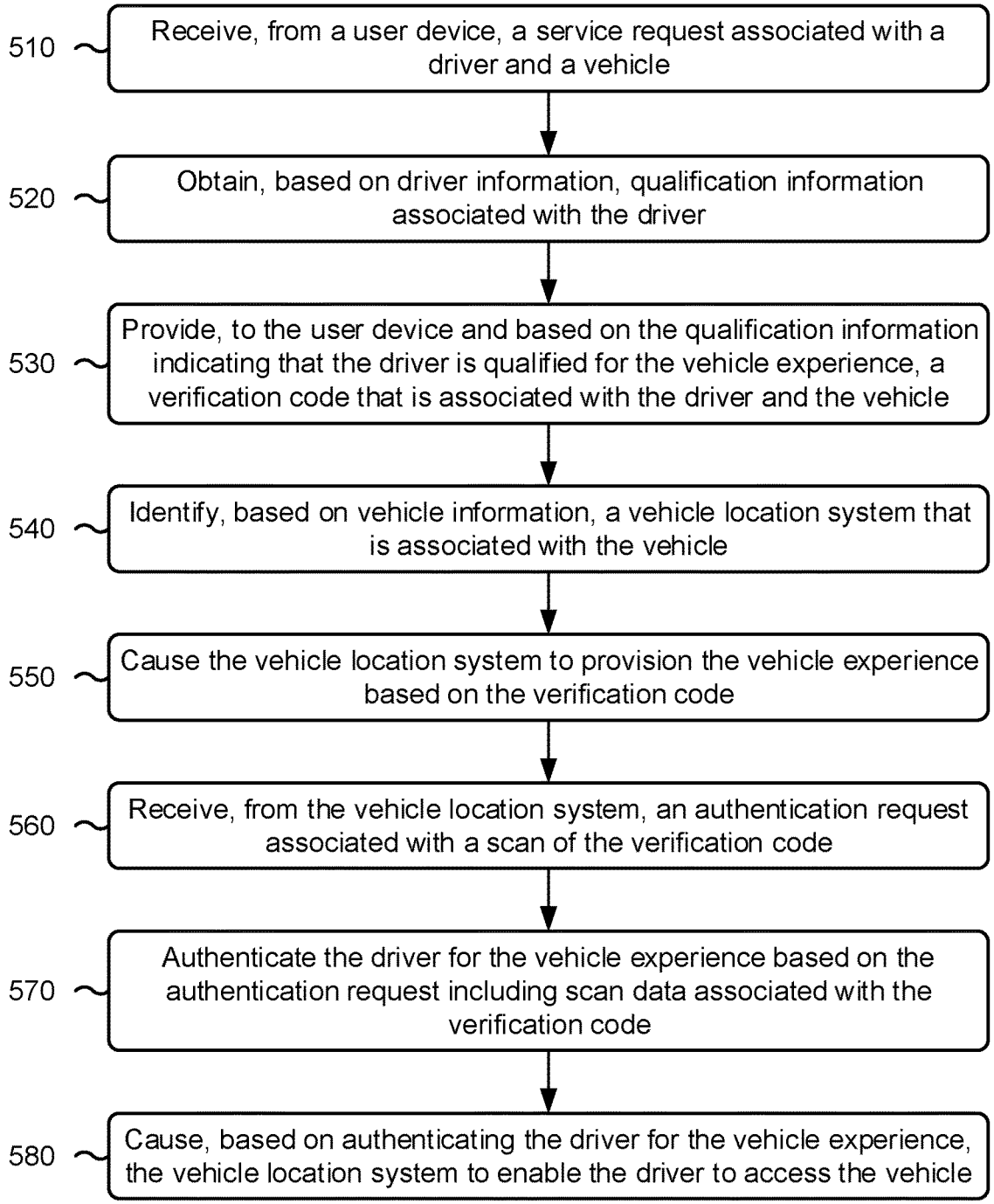
FIG. 5 is a flowchart of an example process relating to provisioning a vehicle experience according to an authentication of a driver for the vehicle experience.

FIG. 5 is a flowchart of an example process 500 associated with provisioning a vehicle experience according to an authentication of a driver for the vehicle experience. In some implementations, one or more process blocks of FIG. 5 may be performed by a vehicle experience system (e.g., vehicle experience system 310). In some implementations, one or more process blocks of FIG. 5 may be performed by another device or a group of devices separate from or including the vehicle experience system, such as a user device (e.g., the user device 320), an agent device (e.g., the agent device 330), a location management system (e.g., the location management system 340), and/or a driver qualification source (e.g., the driver qualification source 370). Additionally, or alternatively, one or more process blocks of FIG. 5 may be performed by one or more components of device 400, such as processor 420, memory 430, storage component 440, input component 450, output component 460, and/or communication component 470.

As shown in FIG. 5, process 500 may include receiving, from a user device, a service request associated with the driver and a vehicle (block 510). In some implementations, the service request includes driver information associated with the driver and vehicle information associated with the vehicle. As further shown in FIG. 5, process 500 may include obtaining, based on the driver information, qualification information associated with the driver (block 520).

As further shown in FIG. 5, process 500 may include providing, to the user device and based on the qualification information indicating that the driver is qualified for the vehicle experience, a verification code that is associated with the driver and the vehicle (block 530). As further shown in FIG. 5, process 500 may include identifying, based on the vehicle information, a location management system that is associated with the vehicle (block 540). As further shown in FIG. 5, process 500 may include causing the location management system to provision the vehicle experience based on the verification code (block 550).

As further shown in FIG. 5, process 500 may include receiving, from the location management system, an authentication request associated with a scan of the verification code (block 560). As further shown in FIG. 5, process 500 may include authenticating the driver for the vehicle experience based on the authentication request including scan data associated with the verification code (block 570). As further shown in FIG. 5, process 500 may include causing, based on authenticating the driver for the vehicle experience, the location management system to enable the driver to access the vehicle (block 580).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for authenticating a driver associated with a vehicle experience, the system comprising:
one or more memories; and
one or more processors, coupled to the one or more memories, configured to:
receive, from a user device, a service request associated with the driver and a vehicle,
wherein the service request includes driver information associated with the driver and vehicle information associated with the vehicle;
obtain, based on the driver information, qualification information associated with the driver;
provide, to the user device and based on the qualification information indicating that the driver is qualified for the vehicle experience, an optical verification code that is associated with the driver and the vehicle;
identify, based on the vehicle information, a location management system that is associated with the vehicle;
cause the location management system to provision the vehicle experience based on the optical verification code;
receive, from the location management system, an authentication request associated with an optical scan of the optical verification code;
authenticate the driver for the vehicle experience based on the authentication request including optical scan data associated with the optical verification code; and
cause, based on authenticating the driver for the vehicle experience, the location management system to enable the driver to access the vehicle.

2. The system of claim 1, wherein the optical verification code is configured to enable the driver to access the vehicle for the vehicle experience based on the optical scan of the optical verification code from the user device.

3. The system of claim 1, wherein the optical verification code is provided to the user device based on receiving a qualification of the driver from a driver qualification source that processed the qualification information to qualify the driver for the vehicle experience.

4. The system of claim 1, wherein the location management system is identified based on being mapped to a location of the vehicle in a vehicle inventory data structure.

5. The system of claim 1, wherein the one or more processors are further configured to:
monitor, via vehicle experience information from the user device or the vehicle, the vehicle experience; and
facilitate operation of the vehicle for the vehicle experience based on the vehicle experience information.

6. The system of claim 1, wherein the one or more processors are further configured to:
monitor, via vehicle experience information from the user device or the vehicle, the vehicle experience; and
store, in a record log, the vehicle experience information in association with the driver information and the vehicle information.

7. The system of claim 1, wherein the optical verification code is configured to be displayed on the user device and scanned by an image capture device of a provisioning device that is configured to provide a physical vehicle key that enables access to the vehicle.

8. A non-transitory computer-readable medium storing a set of instructions, the set of instructions comprising:
one or more instructions that, when executed by one or more processors of a device, cause the device to:
receive a service request associated with a vehicle,
wherein the service request includes driver information associated with a driver and vehicle information associated with the vehicle;
qualify, based on the driver information, the driver for a vehicle experience involving the vehicle;
provide, to a user device associated with the driver and based on qualifying the driver for the vehicle experience, an optical verification code for authenticating the vehicle experience involving the driver and the vehicle;
provide, to a location management system associated with the vehicle, a notification that the vehicle is to be involved in the vehicle experience,
wherein the notification is configured to cause the location management system to provision the vehicle experience based on an authentication of the driver;
receive, from the location management system, scan data associated with a scan of the optical verification code by a provisioning device associated with the location management system; and
provide, to the location management system and based on the scan data being associated with the optical verification code, the authentication of the vehicle experience to enable the provisioning device to facilitate access to the vehicle.

9. The non-transitory computer-readable medium of claim 8, wherein the optical verification code is generated based on at least one of:
a driver characteristic identified in the driver information;
a vehicle characteristic identified in the vehicle information;
a device characteristic associated with the user device; or
a request characteristic associated with the service request.

10. The non-transitory computer-readable medium of claim 8, wherein the driver is qualified for the vehicle experience based on receiving a qualification of the driver based on the driver information.

11. The non-transitory computer-readable medium of claim 8, wherein the vehicle information identifies a location of the vehicle,
wherein the location management system is identified based on the location.

12. The non-transitory computer-readable medium of claim 8, wherein the driver or the vehicle experience is authenticated based on a decryption of the scan data indicating that the provisioning device scanned the optical verification code.

13. The non-transitory computer-readable medium of claim 8, wherein the provisioning device is configured to enable access to a physical vehicle key to the vehicle.

14. The non-transitory computer-readable medium of claim 8, wherein the vehicle experience is configured to involve accessing the vehicle using a physical vehicle key from the provisioning device and test driving the vehicle based on using the physical vehicle key.

15. A method for authenticating a driver for a vehicle experience, comprising:
receiving, by a device and from a user device, a service request for a vehicle experience;
qualifying, by the device and based on driver information in the service request, the driver for the vehicle experience;

identifying, by the device and based on qualifying the driver, a vehicle for the vehicle experience that is associated with vehicle information in the service request;

generating, by the device and based on vehicle experience information in the service request, a digital vehicle key that facilitates access to the vehicle for the vehicle experience, wherein the digital vehicle key is generated in accordance with a device characteristic associated with the user device; and providing, by the device and to the user device, the digital vehicle key to permit the driver to access the vehicle via the user device.

16. The method of claim 15, wherein the digital vehicle key is configured to wirelessly enable access to the vehicle via the user device.

17. The method of claim 15, wherein the vehicle experience information identifies a time period for the vehicle experience,
wherein the digital vehicle key is configured to enable access to the vehicle only during the time period.

18. The method of claim 15, wherein the vehicle experience information identifies a location associated with the vehicle experience,
wherein the digital vehicle key is configured to enable access to the vehicle only in an area that includes the location.

19. The method of claim 15, further comprising:
providing, to a location management system, a notification to provision the vehicle for the vehicle experience during a time period identified in the vehicle experience information,
wherein the digital vehicle key is generated based on a confirmation that the location management system has provisioned the vehicle for the vehicle experience.

20. The method of claim 15, wherein the driver is qualified for the vehicle experience without being an owner of the vehicle.

* * * * *